Nov. 30, 1948.  S. G. SAUNDERS  2,455,341
CLAMP FOR BONDING BRAKE LINING TO BRAKE SHOES
Filed March 19, 1947  2 Sheets-Sheet 1
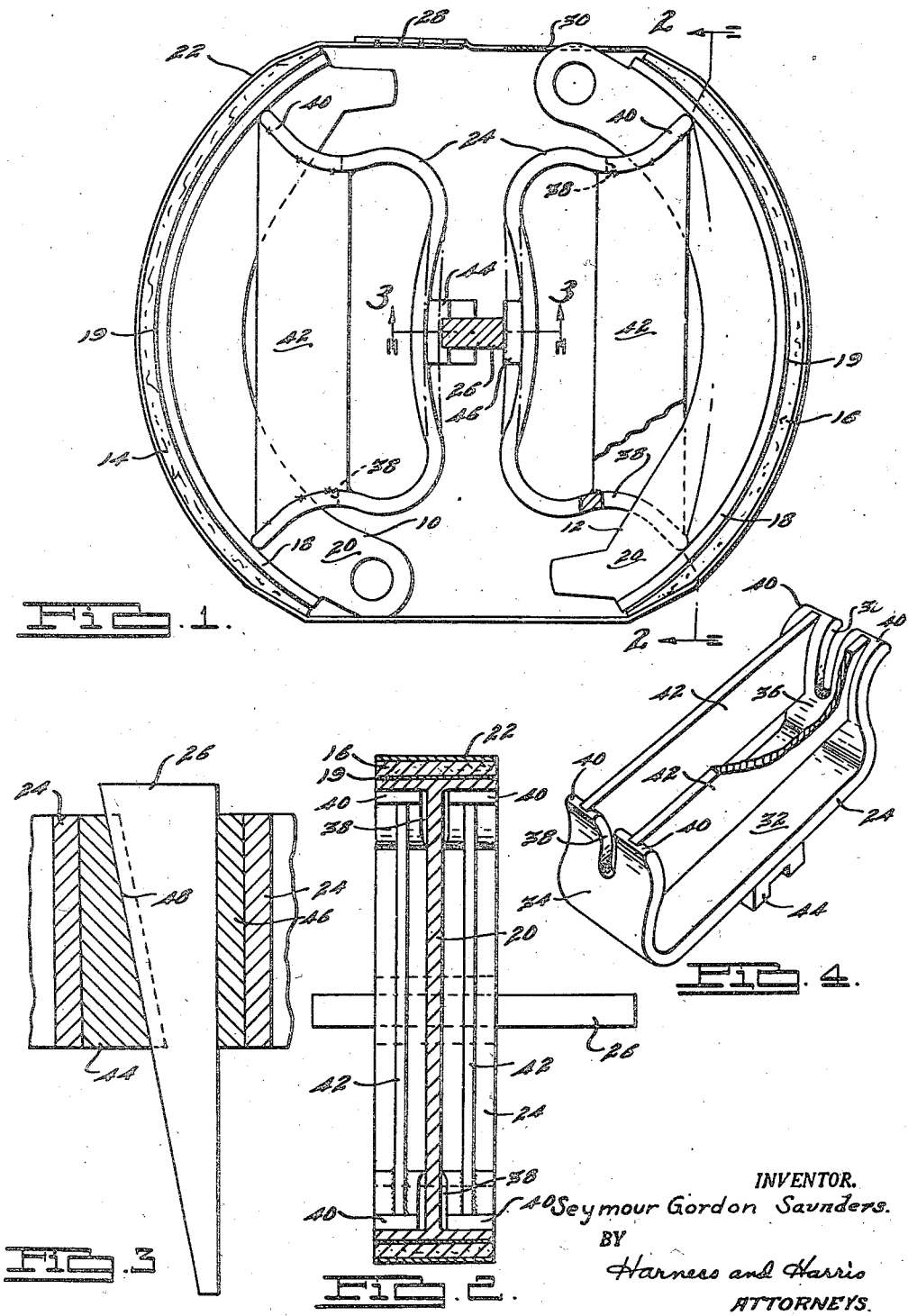
INVENTOR.
Seymour Gordon Saunders.
BY
Harness and Harris
ATTORNEYS.

Nov. 30, 1948. S. G. SAUNDERS 2,455,341
CLAMP FOR BONDING BRAKE LINING TO BRAKE SHOES
Filed March 19, 1947 2 Sheets-Sheet 2
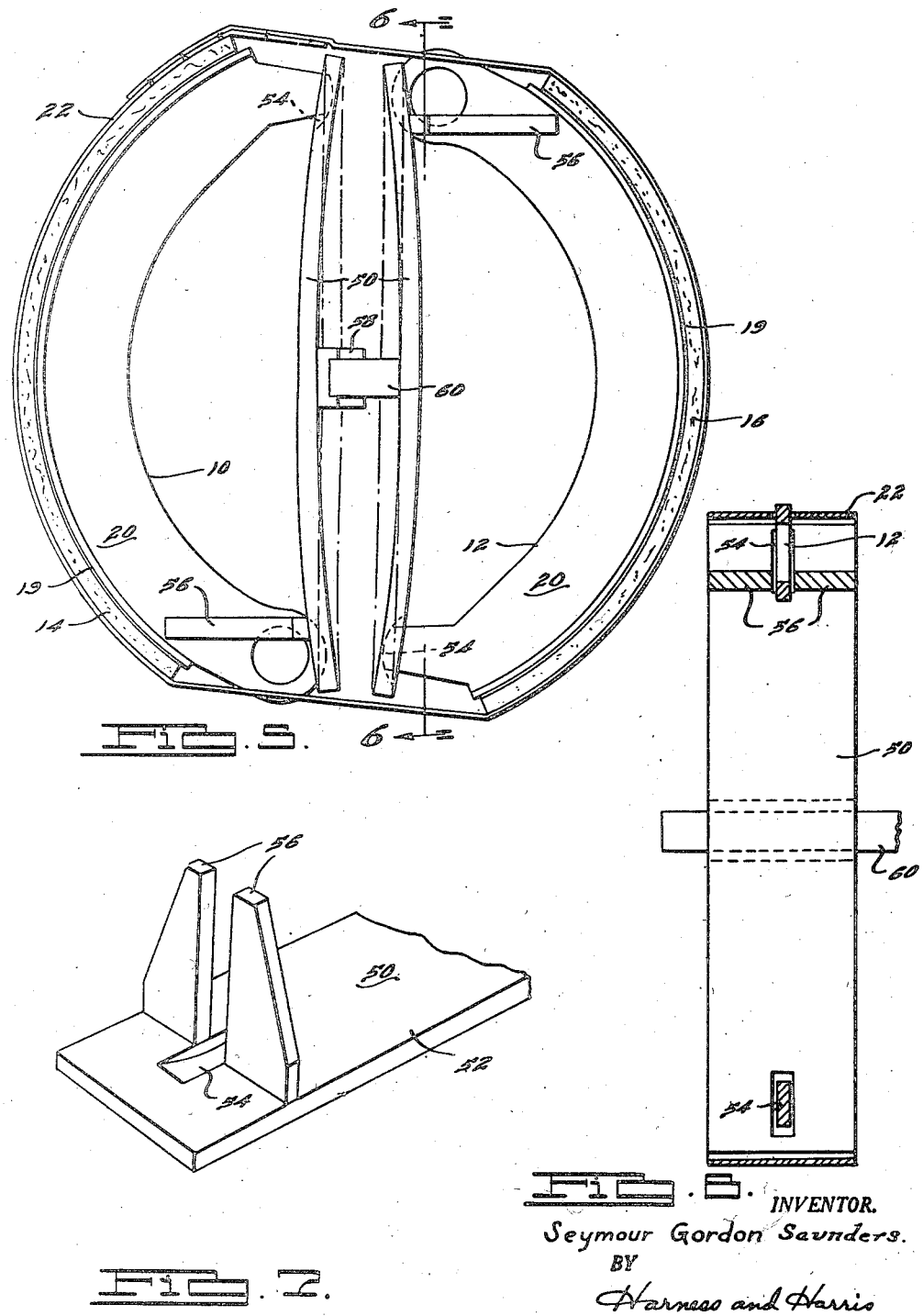
INVENTOR.
Seymour Gordon Saunders.
BY
Harness and Harris
ATTORNEYS.

Patented Nov. 30, 1948

2,455,341

UNITED STATES PATENT OFFICE 2,455,341

CLAMP FOR BONDING BRAKE LINING TO BRAKE SHOES

Seymour Gordon Saunders, Bloomfield Hills, Mich., assignor to Chrysler Corporation, Highland Park, Mich., a corporation of Delaware Application March 19, 1947, Serial No. 735,785

11 Claims. (Cl. 154—1)

This invention relates to apparatus adapted to facilitate the surface bonding of a brake lining to a brake shoe, and particularly to an apparatus adapted to clamp these components together in their proper relative positions and to apply pressure to the components while they are being bonded together as, for example, by a thermosetting cement.

In the bonding of brake components with a thermosetting cement it is necessary that a pressure be maintained between the parts and that the apparatus maintaining this pressure be readily movable so that it may be placed in an oven or other heating device. It is also necessary that the apparatus itself be able to withstand heat. It is an object of my invention to provide an apparatus possessing these attributes. In order that the clamp apparatus be able to withstand heat, I have minimized the number of cooperating parts and eliminated the requirement for lubricating oil by the substitution of a simple wedge for more complicated threading means, etc., previously used in the art.

It is a further object of the invention to provide a clamp adapted to directly engage the lining and the inner surface of the brake shoe rim. This applies pressure directly to the surfaces to be bonded rather than through the web or similar remote component. It is a further object of the invention to utilize the stiffness of the brake shoe to transmit pressure from a two point contact to all surfaces being bonded.

A further object of the invention is to provide, in one of the forms herein described, a clamp adapted to service brake shoes of non-uniform radii.

In the drawings:

Fig. 1 is a plan view of one form of the invention showing a pair of brake shoes and the associated brake lining assembled under pressure in the clamp;

Fig. 2 is a section on the line 2—2 in Fig. 1;

Fig. 3 is a section on the line 3—3 of Fig. 1;

Fig. 4 is a perspective view of one pressure member;

Fig. 5 is a plan view of a modified form of clamp;

Fig. 6 is a section on the line 6—6 of Fig. 5;

Fig. 7 is a perspective view of the end portion of one of the pressure members of the Fig. 5 construction.

Referring to Fig. 1 a pair of brake shoes 10 and 12 are illustrated as assembled in the clamp and forced into contact with brake lining segments 14 and 16 respectively. Each brake shoe comprises a rim 18 and stiffening web 20. The cement which is to be set by pressure and heat or pressure alone is designated by the numeral 19.

The clamp holding these brake shoes and the brake lining segments is illustrated in Fig. 1 as comprising an outer band or strap 22, a pair of diametrically opposed pressure members 24 and a wedge 26. The outer band or strap 22 is preferably formed of a steel strap which is inexpansible within the limits of pressure to be applied by the apparatus and has its end portions welded or otherwise secured as at 28 so that it is continuous. The outer band 22 may be provided with diametrically opposed slots 30 so that end portions of the webs 20 may project therethrough instead of interfering with the operation of the clamp.

The pressure members 24 are best illustrated in Fig. 4 and comprise a flexible backing portion 32 and a pair of side portions 34 and 36, the backing portion 32 and side portions 34 and 36 form in combination a substantially U-shaped section. Each side portion 34 and 36 is slotted as at 38 to bisect the outer ends thereof into a pair of fingers 40. The slot at 38 is provided so that no portion of the pressure members will contact the web portion 20 of the brake shoe. The fingers 40 are adapted to engage the inner surface of the rim 18 of the brake shoe. A pair of stiffeners 42 connect corresponding fingers on each side portion so that the fingers themselves are substantially rigid.

A track member 44 is secured to the center of the back portion 32 of one pressure member 24. The other pressure member 24 is provided with a pressure plate 46 which is secured to the backing portion 32 of that pressure member. The wedge 26 is adapted to be received in the track member 44 and to contact the pressure plate 46. The base 48 of the track member 44 has a slope substantially equal to the slope of one side of the wedge 26. The wedge 26 may thus be driven by any suitable means such a hand hammer between the track member 44 and the pressure plate 46. The forced entrance of the wedge 26 flexes the backing portion 32 of each expansible member 24 and thus provides some resiliency in the pressure-transmitting members. The forced entrance of wedge 26 between the track member 44 and pressure plate 46 tends to separate expansible members 24 thereby forcing the fingers 40 of each member 24 outward relative to the brake shoe 20. Pressure thus applied is transmitted through the fingers 40 to the rim portion 18 of each shoe. The stiffness of the shoe itself transmits the pressure to the cement and lining 14 and the reacting force is provided by the strap 22. The entire assembled unit illustrated in Fig. 1 may be conveniently lifted manually and placed in an oven for heating. The pressure will be maintained until the wedge 26 is forcibly removed as by a blow in the reverse direction from a hand hammer.

A modified clamp construction is illustrated in Figs. 5, 6, and 7. In Fig. 5 the brake shoes 10 and 12, lining segments 14 and 16, and cement 18 are intended to be substantially the same as those illustrated in Fig. 1. An outer strap 22 having a construction similar to the band 22 of Fig. 1 is also illustrated. The pressure members 50 which are to be wedged apart are substituted for the pressure members 24 of the Fig. 1 construction. Each of these members has a substantially rectangular base portion 52, each base portion 52 is provided with a pair of recesses 54. One of said recesses is positioned adjacent each end of each base portion 52 and the end portions of the brake shoe webs 20 are received by these recesses. A pair of spaced ears 56 extend laterally from each base portion 52. The ears 56 are adapted to straddle the web 20 and prevent the brake shoe from tipping over as pressure is applied. A suitable track 58 is provided for the reception of a wedge 60. As the wedge is driven into place, it engages the track 58 and one of the members 50 thereby tending to force the members 50 apart and flexing the base portions 52. This urges each brake shoe outwardly toward the strap 22. The brake lining and cement are thus compressed on the surface of the brake shoe. The flexure of the members 50 illustrated in Fig. 5 provides a certain resiliency to the transmission of force from the wedge 60.

I claim:

1. A clamp comprising an endless strap adapted to encircle a pair of diametrically opposed brake shoes having brake lining segments associated therewith, means for expanding the brake shoes against said segments while said segments are prevented from expanding by said strap, said means including members adapted to engage said brake shoes, and a wedge adapted to be driven between said members to separate said members.

2. A clamp comprising a strap having its ends secured together to thereby enclose an area, a pair of members adapted to be positioned within said area in diametrically opposed positions, each of said members being adapted to cooperate with said strap to retain a brake shoe and brake lining segment between each of said members and said strap, and wedge means adapted to cooperate with and separate said members and thereby press each brake shoe against its associated brake lining segment while a corresponding movement of said brake lining segment is restricted by said strap.

3. An apparatus for bonding brake lining to brake shoes comprising an outer band member having diametrically opposed arcuate portions, a pair of inner members each radially aligned with one of said portions, each of said inner members being adapted to engage the inner surface of a brake shoe having a brake lining segment associated therewith, and wedge means to force said inner members radially apart whereby said brake shoes and the associated brake lining segment may be compressed between said inner members and said band member.

4. A clamp comprising an endless strap adapted to encircle a pair of diametrically opposed brake shoes having brake lining segments associated therewith and means for expanding the brake shoes against said segments while said segments are prevented from expanding by said strap, said means including a pair of members each having first portions adapted to engage one of said brake shoes and a relatively flexible portion connecting said first portions, and a wedge adapted to be driven between the flexible portions of said members to apply pressure to said first portions.

5. A clamp comprising an endless strap adapted to encircle a pair of diametrically opposed brake shoes having brake lining segments associated therewith, means for expanding the brake shoes against said segments while said segments are prevented from expanding by said strap, said means including a pair of members each having rigid portions adapted to engage one of said brake shoes and a relatively flexible portion connecting said rigid portions, and a wedge adapted to be driven between the flexible portions of said members to separate said members.

6. A clamp comprising an endless strap adapted to encircle a pair of diametrically opposed brake shoes having an arcuate rim portion and a strengthening web portion and a brake lining segment associated with the exterior surface of each rim portion, means for expanding the brake shoes against said segments while said segments are prevented from expanding by said strap, said means including members adapted to engage said rim portions, and means to spread said members.

7. A clamp comprising an endless strap adapted to encircle a pair of diametrically opposed brake shoes each having an arcuate rim portion and a strengthening web portion and a brake lining segment associated with the exterior surface of each rim portion, means for expanding the brake shoes against said segments while said segments are prevented from expanding by said strap, said means including members adapted to engage said brake shoes, a pair of fingers associated with each of said members and adapted to straddle said web portion, and means to separate said members.

8. A clamp comprising an endless strap adapted to encircle a pair of diametrically opposed brake shoes each having an arcuate rim portion and a strengthening web portion and a brake lining segment associated with the exterior surface of each rim portion, means for expanding the brake shoes against said segments while said segments are prevented from expanding by said strap, said means including a pair of members, each of said members comprising a base portion and bifurcated end portions, said bifurcated end portions being adapted to straddle said web portion and engage said rim portion, and wedge means adapted to be driven between said members to spread said members.

9. A clamp comprising an endless strap adapted to encircle a pair of diametrically opposed brake shoes each having an arcuate rim portion and a strengthening web portion and a brake lining segment associated with the exterior surface of each rim portion, means for expanding the brake shoes against said segments while said segments are prevented from expanding by said strap, said means including a pair of members, each of said members comprising a base portion and a pair of end portions, each of said end portions being bifurcated to form a pair of fingers adapted to engage the concave surface of said rim portion on each side of said strengthening web portion, stiffening members connecting the fingers on each side of said web portion, and wedge means adapted to spread said members.

10. A clamp comprising an endless strap adapted to encircle a pair of diametrically opposed brake shoes each having an arcuate rim portion and a strengthening web portion and a brake lining segment associated with the exterior surface of each rim portion, means for expanding the brake shoes against said segments while said segments are prevented from expanding by said strap, said means including a pair of plates each having a plurality of recesses therein adapted to receive a portion of one of said brake shoes to locate said shoes relative to said plates, and wedge means to spread said plates.

11. A clamp comprising an endless strap adapted to encircle a pair of diametrically opposed brake shoes having brake lining segments associated therewith and means for expanding the brake shoes against said segments while said segments are prevented from expanding by said strap, said means including a pair of plates each having a plurality of recesses therein adapted to receive a portion of one of said brake shoes and wedge means to spread said plates.

SEYMOUR GORDON SAUNDERS.

REFERENCES CITED

The following references are of record in the file of this patent:

UNITED STATES PATENTS

| Number | Name | Date |
|---|---|---|
| 1,785,076 | Freshkoff | Dec. 16, 1930 |
| 1,869,343 | Parker | July 26, 1932 |
| 1,910,507 | Stoner | May 23, 1933 |
| 2,358,483 | Tilden | Sept. 19, 1944 |
| 2,426,421 | Tilden | Aug. 26, 1947 |